(12) United States Patent
Kraus

(10) Patent No.: US 7,108,017 B2
(45) Date of Patent: Sep. 19, 2006

(54) SINGLE-PIECE SEALING COVER

(75) Inventor: Willibald Kraus, Gründstadt (DE)

(73) Assignee: TRW Automotive Electronics & Components GmbH & Co. KG, (DE)

( * ) Notice: Subject to any disclaimer, the term of this patent is extended or adjusted under 35 U.S.C. 154(b) by 319 days.

(21) Appl. No.: 10/725,681

(22) Filed: Dec. 2, 2003

(65) Prior Publication Data

US 2004/0151533 A1 Aug. 5, 2004

(30) Foreign Application Priority Data

Dec. 2, 2002 (DE) .......................... 202 18 716 U

(51) Int. Cl.
*F16L 55/10* (2006.01)
(52) U.S. Cl. ..................... 138/89; 138/92; 220/789
(58) Field of Classification Search ............... 138/89, 138/92; 411/510; 24/197; 220/789
See application file for complete search history.

(56) References Cited

U.S. PATENT DOCUMENTS

| | | | | |
|---|---|---|---|---|
| 3,481,242 A | * | 12/1969 | Topf | 411/502 |
| 4,334,632 A | * | 6/1982 | Watanabe | 220/787 |
| 4,399,927 A | * | 8/1983 | Yaotani et al. | 220/789 |
| 4,874,186 A | * | 10/1989 | Groswith, III et al. | 281/28 |
| 4,998,642 A | * | 3/1991 | Kraus | 220/782 |
| 5,046,775 A | * | 9/1991 | Marcum et al. | 296/39.2 |
| 6,296,136 B1 | * | 10/2001 | Huet | 220/233 |
| 6,588,071 B1 | * | 7/2003 | Gramss | 24/297 |

* cited by examiner

Primary Examiner—James Hook
(74) Attorney, Agent, or Firm—Fay, Sharpe, Fagan, Minnich & McKee, LLP

(57) ABSTRACT

A single-piece sealing cover 1, made of plastic, especially for sealing an opening 2 in a support 3, includes a basic body 5, which is joined with a circumferential collar 8, which is designed in the shape of a U, with an inner leg 10, an intermediate region 12 and an outer leg 14, and with at least one stop connection 16 at the outer leg 14. The sealing cover is characterized in that the outer leg 14 and the basic body 48 can be locked together by means of the stop connection 16, after pre-assembly V, by insertion into the opening 2 and after final assembly E and an outer collar 24 and the disk-shaped basic body 5 extend in parallel after final assembly E.

18 Claims, 1 Drawing Sheet

SINGLE-PIECE SEALING COVER

Figure 1:
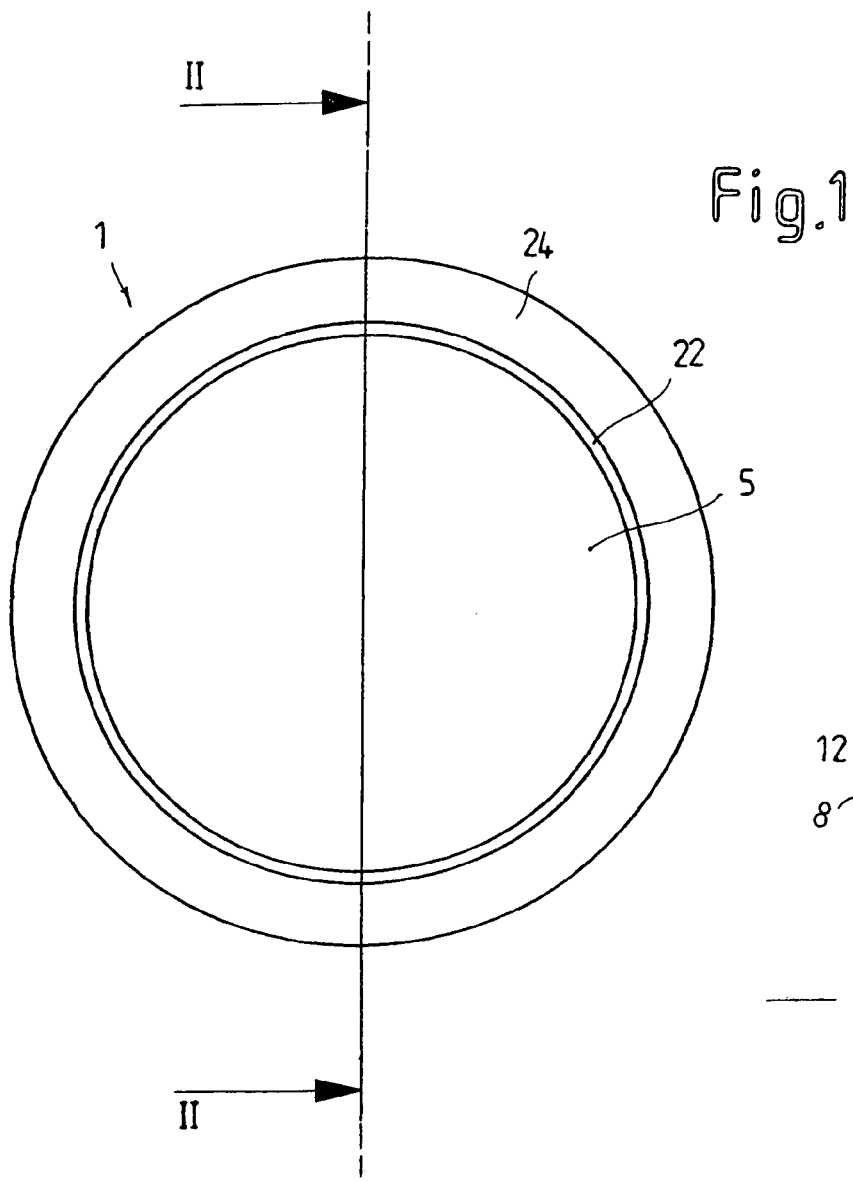

The invention relates to a single-piece sealing cover made of plastic, especially for sealing an opening in a support according to the preamble of Claim 1.

Such sealing covers are already known according to the state of the art (DE 35 12 582 C3, DE 37 13 503 C1). These sealing covers respectively present an elastic sealing lip and, opposite to same, one or several locking rings. As a result of which, in mounted state, tight sealing is to be guaranteed, following final assembly, in addition to reliable holding in a support.

Another construction, on which the present invention is based, is designed in such manner that the basic body is in the form of a funnel-shaped, circumferential collar, with the bottom being able to be moved in parallel to the support opening and the bottom and a wall element presenting cooperating locking elements (DE 39 02 500 C2).

It is the object of the present invention to improve such single-piece sealing covers and to simplify their handling, while tight sealing is, nevertheless, assured.

Said object is solved according to the invention in that the outer leg and the basic body can be locked together, after pre-assembly, via the stop connection, by insertion into the support and following final assembly, and that after the final assembly the outer collar and the disk-shaped basic body extend in parallel.

This results in the advantage that the single-piece sealing, cover is easily inserted into an opening, whereby, following said pre-assembly, the stop connection between outer leg and basic body is established by means of pressure upon the disk-shaped basic body, causing part of the outer leg and the intermediate region gripping in bulge-like manner behind a circumferential flange of the support, thus assuring a tight seal.

Beneficial further designs are evident from the sub-claims.

The invention is described in more detail below, making use of an exemplary embodiment represented in the drawing. The drawing depicts:

FIG. 1 a bird's eye view onto the invention-specific sealing cover.

Figure 2:
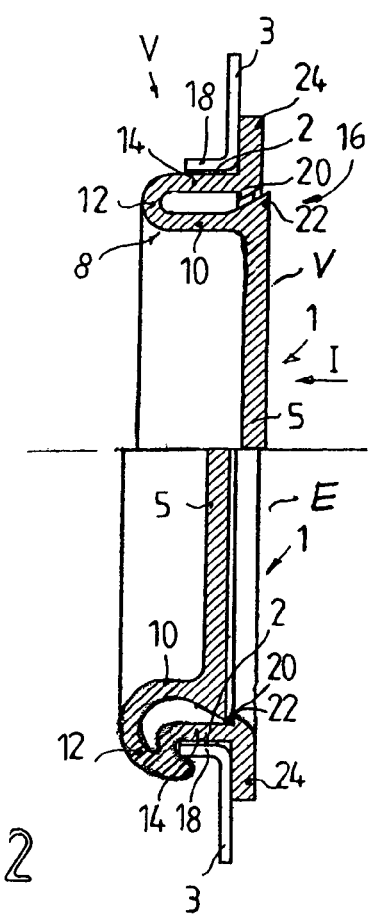

FIG. 2 a section according to line II—II in FIG. 1, with the upper representation showing pre-assembly state, and the lower representation indicating the final assembly.

The single-piece invention-specific sealing cover 1, which is made of plastic, serves for sealing an opening 2 in a support 3 according to FIG. 2. Said sealing cover has a disk-shaped basic body 5, adjacent to which is a circumferential collar 8. The collar is designed in the shape of a U, with an inner leg 10, an intermediate region 12 and an outer leg 14. In this arrangement the intermediate region 12 connects the inner leg 10 with the outer leg 14.

In the entrance region, the outer leg 14 presents a circumferential edge 20, which can interact with an opposing edge 22 of the basic body 5, thus forming a stop connection 16.

Adjacent to the circumferential edge 20 of the outer leg 14 is an outer collar 24 which impinges upon the support in the region of the opening 2. The support 3 preferentially presents a circumferential flange 18, which extends in parallel to the inner leg 10 or the outer leg 14. The outer collar 24 and the disk-shaped basic body 5 likewise preferentially extend in parallel.

It is, moreover, discernible from FIG. 2 that the basic body is positioned higher in pre-assembly V and is positioned lower in the final assembly E than the outer collar 24.

Furthermore, it is discernible from FIG. 2 that the inner leg 10 and the outer leg 14 extend in parallel vis-a-vis each other and that the inner leg 10 is joined at a right angle with the disk-shaped basic body 5 and the outer leg 14 is joined at a right angle with the outer collar 24.

FIG. 2 represents in the upper region the pre-assembly V. Here, the invention-specific sealing cover 1 is inserted into the opening 2 of a support 3, with the outer collar 24 impinging upon the surface of the support 3 and the outer leg 14 being positioned in parallel to the circumferential flange 18 of the opening 2 of the support 3.

Following said final assembly, pressure is exerted upon the disk-shaped basic body 5 in the direction of the arrow I, as a result of which an opposing edge 22 of the basic body 5 grips behind an edge 20 in the entry region of the outer leg 14, and the position is adopted of the lower representation according to FIG. 2. Accordingly, the stop connection 16 between the outer leg 14 and the basic body 5 is established, with a portion of the intermediate region 12 and a portion of the outer leg 14 in this position partially gripping behind the circumferential flange 18 in bulge-like fashion, thus assuring tightness in addition to reliable holding. The circumferential collar 18 and a region of the opening 2 of the support 3 are thus acted upon in fail-safe manner by the outer leg 24 and the bulge-like overlap of the intermediate region 12 and the outer leg 14. After final assembly E there thus is assurance of perfect seating of the sealing cover in the opening 2 of the support 3.

Final assembly E can be counter-acted by exertion of pressure upon the basic body 5 in the opposite direction of arrow I, as a result of which edge 20 no longer grips behind the opposing edge 22 and the position according to stance V is adopted again.

The entire design is simply constructed, can be assembled quickly and presents high effectiveness.

The invention claimed is:

1. A single-piece sealing cover made of plastic, for sealing an opening in an associated support, the sealing cover comprising:
a basic body, which is joined with a U-shaped circumferential collar, the collar having an inner leg, an intermediate region and an outer leg, an outer collar, and at least one stop connection at the outer leg, the outer leg and the basic body being lockable with each other, via the stop connection by insertion into said associated opening after pre-assembly, and after final assembly, said outer collar and the basic body having a disk-shape and extending in parallel after final assembly, wherein the outer leg includes a circumferential edge and the basic body includes an opposing edge, whereby, after final assembly, the circumferential edge grips in locked position behind said opposing edge of the basic body, and wherein the circumferential edge of the outer leg is joined with the outer collar and is adapted to act upon the support in the region of the opening, and wherein in said pre-assembled state the basic body is positioned higher than the outer collar and in said final assembly is positioned lower than the outer collar.

2. The sealing cover according to claim 1, wherein the opening of support includes a circumferential flange, wherein after locking of the outer leg with the basic body, following final assembly, the intermediate region and the outer leg partially grip in bulge-like fashion behind the circumferential flange of the support.

3. A single piece sealing cover made of plastic, for sealing an opening in an associated support, the sealing cover comprising:
a basic body, which is joined with a U-shaped circumferential collar, the collar having an inner leg, an intermediate region and an outer leg, an outer collar, and at least one stop connection at the outer leg, the outer leg and the basic body being lockable with each other, via the stop connection by insertion into said associated opening after pre-assembly, and after final assembly, said outer collar and the basic body having a disk-shape and extending in parallel after final assembly, wherein the outer leg includes a circumferential edge and the basic body includes an opposing edge, whereby, after final assembly, the circumferential edge grips in locked position behind said opposing edge of the basic body, and wherein the circumferential edge of the outer leg is joined with the outer collar and is adapted to act upon the support in the region of the opening, and wherein the inner leg and the outer leg extend in parallel to each other and that the inner leg joins the disk-shaped basic body at a right angle and the outer collar joins the outer leg at a right angle.

4. The sealing cover according to claim 3, wherein the opening of support includes a circumferential flange, wherein after locking of the outer leg with the basic body, following final assembly, the intermediate region and the outer leg partially grip in bulge-like fashion behind the circumferential flange of the support.

5. A sealing cover for insertion into an opening formed in an associated support for closing and sealing said opening, the sealing cover comprising:
a main body portion;
a continuous peripheral outer collar extending radially outwardly relative to said main body portion, the outer collar being adapted to engage a first surface of said associated support adjacent said opening;
a generally U-shaped circumferential collar connecting the main body portion with the outer collar, the circumferential collar permitting relative axial movement between the main body portion and the outer collar between a first preassembly position whereat the sealing cover is loosely received in said associated opening and said main body portion is positioned higher than the outer collar, and a second assembled position whereat the sealing cover is locked onto said associated support in said opening with said main body portion being positioned lower than said outer collar; and,
a stop connection for selectively holding the main body portion with the outer collar in said second assembled position to close and seal the opening.

6. The sealing cover according to claim 5 wherein the circumferential collar includes an intermediate region formed between an inner leg and an outer leg, the inner leg being connected on a first end to said main body portion and connected on a second end to said intermediate region, and the outer leg being connected on a first end to said outer collar and connected on a second end to said intermediate portion.

7. The sealing cover according to claim 6 wherein the circumferential collar is flexible and
in said first preassembly position, the intermediate region is disposed radially inwardly of said outer leg for insertion of the sealing cover into said opening formed in the associated support; and,
in said second assembled position the intermediate region is disposed radially outwardly of said outer leg for engaging a second surface of said associated support opposite said first surface for holding the sealing cover in said opening on said associated support to close and seal the opening.

8. The sealing cover according to claim 7 wherein the support defines a lip surrounding said opening and
said outer leg forms a bulge to surroundingly engage said lip of the associated support for holding the sealing cover in said opening when the main body portion and the peripheral outer collar are arranged in said assembled position.

9. The sealing cover according to claim 7 wherein the associated support is grasped between said outer collar and said outer leg when the main body portion and the outer collar are moved to said second assembled position.

10. The sealing cover according to claim 9 wherein the stop connection includes:
a first member carried on the main body portion; and,
a second member carried on the continuous peripheral outer collar, the first member and the second member being disposed in an opposing relationship and adapted for selective mutual latching based on a relative axial position between the main body portion and the outer collar.

11. The sealing cover according to claim 10 wherein:
the first member is a continuous radially outwardly extending lip carried on the main body portion; and,
the second member is a continuous radially inwardly extending lip carried on the peripheral outer collar.

12. The sealing cover according to claim 11 wherein the main body portion, the outer collar, the circumferential collar, and the stop connection are integrally formed.

13. The sealing cover according to claim 5 wherein the stop connection includes:
a first member carried on the main body portion; and,
a second member carried on the continuous peripheral outer collar, the first member and the second member being disposed in an opposing relationship and adapted for selective mutual latching based on a relative axial position between the main body portion and the outer collar.

14. The sealing cover according to claim 13 wherein:
the first member is a continuous radially outwardly extending lip carried on the main body portion; and,
the second member is a continuous radially inwardly extending lip carried on the peripheral outer collar.

15. The sealing cover according to claim 14 wherein the main body portion, the outer collar, the circumferential collar, and the stop connection are integrally formed.

16. A single-piece sealing cover made of plastic, for sealing an opening in an associated support, the sealing cover comprising:
a basic body, which is joined with a U-shaped circumferential collar, the collar having an inner leg, an intermediate region and an outer leg, an outer collar, and at least one stop connection at the outer leg, the outer leg and the basic body being lockable with each other, via the stop connection by insertion into said associated opening after a pre-assembly state, and after a final assembly state, said outer collar and the basic body having a disk-shaped and extending in parallel after final assembly, wherein in said pre-assembly state the basic body is positioned higher than said outer collar and in said final assembly state the basic body is positioned lower than said outer collar.

17. Single-piece sealing cover made of plastic, for sealing an opening in an associated support, the sealing cover comprising:
- a basic body, which is joined with a U-shaped circumferential collar, the collar having an inner leg, an intermediate region and an outer leg, an outer collar, and at least one stop connection at the outer leg, the outer leg and the basic body being lockable with each other, via the stop connection by insertion into said associated opening after pre-assembly, and after final assembly, said outer collar and the basic body having a disk-shaped and extending in parallel after final assembly, wherein the inner leg and the outer leg extend in parallel to each other and the inner leg joins the disk-shaped basic body at a right angle and the outer collar joins the outer leg at a right angle.

18. A sealing cover for insertion into an opening formed in an associated support for closing and sealing said opening, the sealing cover comprising:
- a main body portion;
- a continuous peripheral outer collar extending radially outwardly relative to said main body portion, the outer collar being adapted to engage a first surface of said associated support adjacent said opening;
- a generally U-shaped circumferential collar connecting the main body portion with the outer collar, the circumferential collar permitting relative axial movement between the main body portion and the outer collar between a first preassembly position whereat the sealing cover is loosely received in said associated opening and said main body portion is positioned higher than the outer collar, and a second assembled position whereat the sealing cover is locked onto said associated support in said opening with said main body portion being positioned lower than said outer collar; and,
- a stop connection for selectively holding the main body portion with the outer collar in said second assembled position to close and seal the opening, wherein the circumferential collar includes an intermediate region formed between an inner leg and an outer leg parallel with the inner leg, the inner leg being connected at a right angle on a first end to said main body portion and connected on a second end to said intermediate region, and the outer leg being connected on a first end at a right angle to said outer collar and connected on a second end to said intermediate portion.

* * * * *